Inventors:
Frederick A. Ludewig, Jr.
James L. Myracle,
by Louis A. Moucha

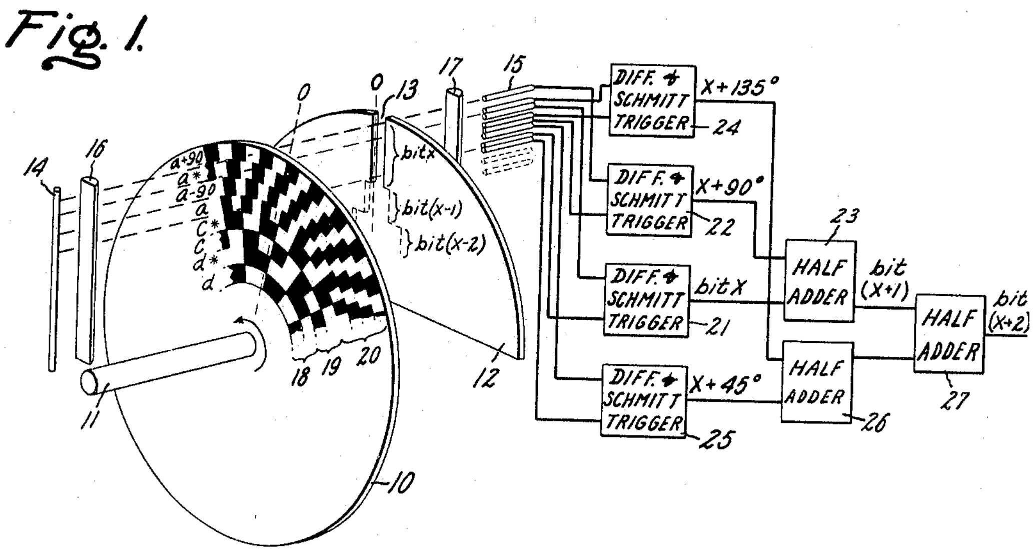
Fig. 2.
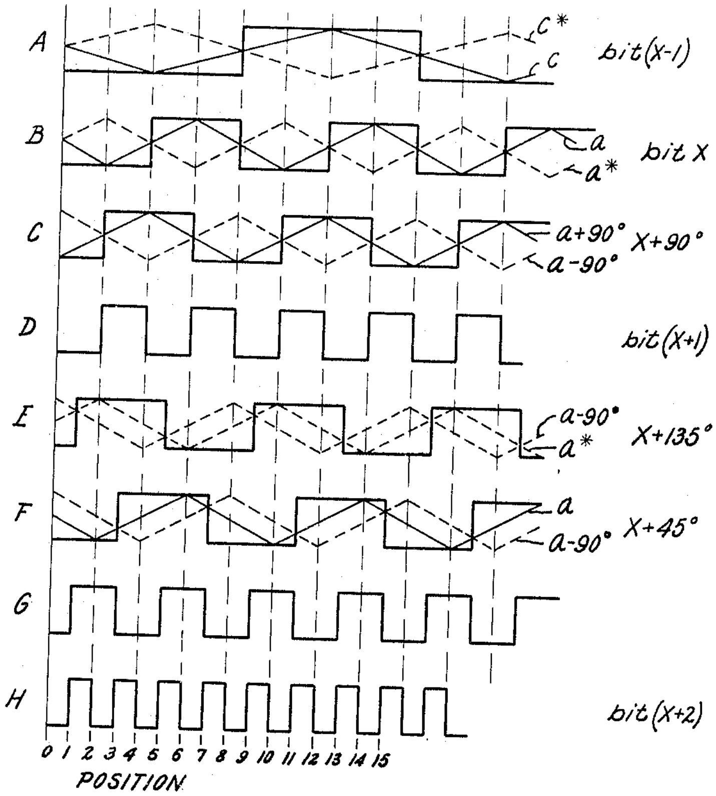
Inventors:
Frederick A. Ludewig, Jr.
James L. Myracle,
by Louis A. Moncha Inventors:
Frederick A. Ludewig, Jr.
James L. Myracle,
by Louis A. Moucha Dec. 30, 1969 F. A. LUDEWIG, JR., ET AL 3,487,400
SYSTEM FOR EXTENDED RESOLUTION OF A BINARY CODED PATTERN DEVICE
Filed June 30, 1966 4 Sheets-Sheet 3

Inventors:
Frederick A. Ludewig, Jr.
James L. Myracle,
by Louis A. Moucha

United States Patent Office 3,487,400

Patented Dec. 30, 1969

3,487,400

SYSTEM FOR EXTENDED RESOLUTION OF A BINARY CODED PATTERN DEVICE

Frederick A. Ludewig, Jr., Ballston Spa, and James L. Myracle, Scotia, N.Y., assignors to General Electric Company, a corporation of New York Filed June 30, 1966, Ser. No. 561,916

Int. Cl. H04l 3/00; H03k 13/00

U.S. Cl. 340—347 16 Claims

ABSTRACT OF THE DISCLOSURE

An extended resolution of a binary coded pattern equal to two additional bits in the straight binary code, and one bit in the reflected binary code is obtained by forming the least significant bit into four groups of alternately transparent and opaque areas phase displaced from the first group by +90°, −90°, and 180°. The phase displacement can be on either the binary coded pattern member or mask member associated therewith. Triangular shaped signals obtained from the energy transmitted through the transparent areas in the binary coded pattern member and mask member are combined in differential amplifier and amplitude detecting circuits for generating first, second, third, and fourth square wave signals wherein the second, third, and fourth signals are phase displaced from the first signals by 45°, 90°, and 135°. The square wave signals are then combined in half-adder logic circuitry to develop signals representing the extended resolution in the straight binary code.

Our invention relates to an improved binary scale reading system in a digital transducer, and in particular, to a system for extending the resolution of a binary coded pattern by two additional binary bits beyond the least significant binary bit of information provided thereon.

The use of digital computers in control systems is greatly increasing, and as a result it becomes increasingly necessary to convert large quantities of data and other information in analog form to digital form for use by the computers in the system. The conversion equipment for converting the data from analog to digital form necessarily increases the complexity of the system and also inserts an additional source of potential error. Thus, it is desirable that sensors or transducers which provide a digital output signal in response to a phenomenon being measured be employed, instead of the more conventional analog signal producing devices. The control system which employs a digital transducer is greatly simplified over the conventional approaches requiring analog to digital conversion units, and is more reliable in that the possibility of loss of information in the conversion and transmission is reduced. While there are some digital transducers available, they are not practical for all applications since their accuracy is limited by their resolution. Thus, in the digital transducers known as shaft encoders which respectively convert rotary and linear position to a proportional digital number, an optical system utilizing a binary coded pattern device comprising a plurality of rulings or tracks having alternately optically transparent and opaque areas is generally limited in resolution to approximately 5,000 lines per inch. While the binary coded pattern device may be enlarged to improve the resolution, this approach is not practical for most applications, and for this reason it is desirable to provide a practical, relatively simple and inexpensive means for improving the resolution of a binary coded pattern device.

Therefore, a primary object of our invention is to provide an improved binary scale reading system for obtaining extended resolution of a digital transducer beyond the limit defined by the least significant binary bit on the binary coded pattern device thereof.

Systems are known for extending the resolution of a binary coded pattern by one additional bit in the case of the straight binary code, but none are known for extending resolution of the reflected (Gray) binary code.

Another object of our invention is to extend the resolution of the binary coded pattern device by two additional bits in a straight binary code application.

A still further object of our invention is to extend the resolution of the binary coded pattern device by one additional bit in a reflected binary code application.

In carrying out the objects of our invention, we provide an improved binary scale reading system comprising a binary coded pattern and readout means which generates first, second, third and fourth periodic square wave signals of a particular type energy wherein the second, third and fourth periodic square waves are respectively phase displaced from the first waves by 45°, 90° and 135° in the case of the straight binary code. The square waves have a spatial width (half wave length) equal to the least significant binary bit width on a movable binary coded pattern member, and the aforementioned first square wave signals represent the least significant bit signals derived therefrom. A logic circuit combines the four square wave signals to produce fifth and sixth periodic square wave signals having a spatial width respectively equal to ½ and ¼ of the first waves. The fifth and sixth square wave signals represent an extended resolution of the binary coded pattern equal to two additional bits of information. In the particular example of a digital transducer responsive to optical energy and providing electrical output signals, the four periodic square wave signals are generated in a system comprising a light source, photocells, a movable binary coded pattern member and readout mask member positioned in alignment therebetween, and an electrical circuit connected to the outputs of the photocells associated with the least significant bit track. The binary coded pattern member is provided with the conventional plurality of binary bit tracks each comprising pairs of alternately transparent and opaque areas. The least significant bit track as represented on the readout mask in the preferred embodiment of our invention is comprised of four groups of alternately transparent and opaque areas. The second, third and fourth groups of these areas are respectively phase displaced from the first group by +90°, −90° and 180°. The aforementioned electrical circuit combines the outputs of particular pairs of the photocells to generate the four phase displaced periodic square wave signals. A similar system can be employed requiring periodic square wave signals displaced +45° and −45°, for extending the resolution in the reflected (Gray) binary code by one bit.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings, wherein:

FIGURE 1 illustrates a first embodiment in perspective and block diagram form, of a digital transducer employing our binary scale reading system for extending the resolution of a binary coded pattern by two additional bits in the straight binary code;

FIGURE 2 is a series of wave shapes of signals, and their phase relation as derived by the block diagram elements in FIGURE 1;

Figure 7:
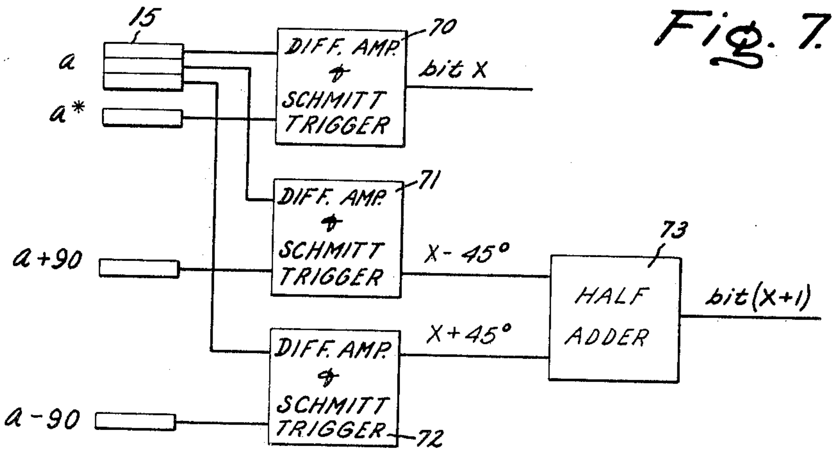
Figure 8:
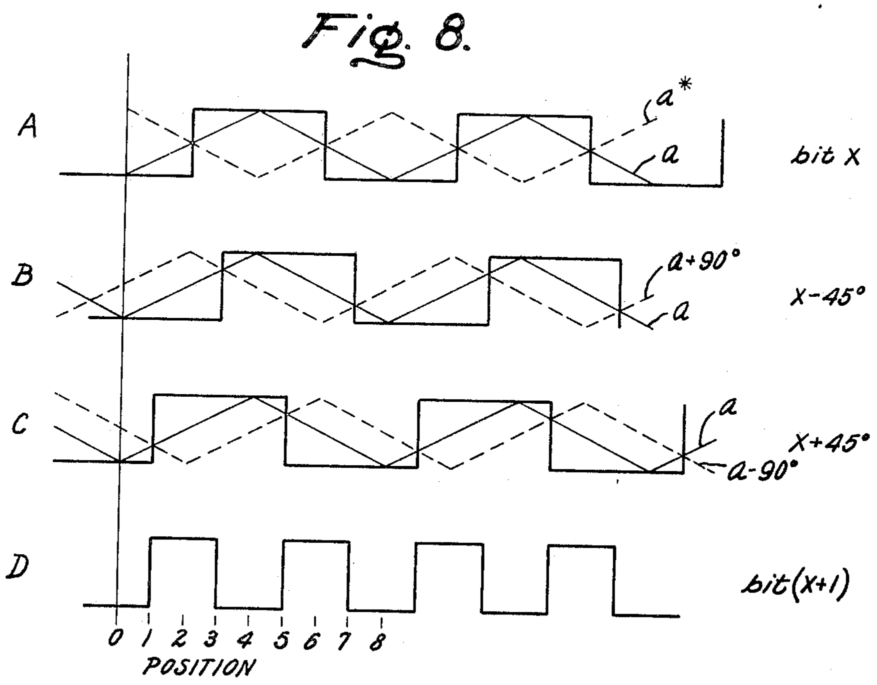

FIGURE 7 illustrates a second embodiment of the block diagram portion of the system illustrated in FIGURE 1 which is adapted for use in obtaining an extended resolution in the reflected binary code; and FIGURE 8 is a series of wave shapes of signals, and their phase relation as derived by the block diagram elements in FIGURE 7, illustrating their wave shapes and phase relation when used to extend the reflected binary code resolution.

Referring now in particular to FIGURE 1, there is shown a digital transducer of the shaft encoder type provided with an improved binary scale reading system constructed in accordance with our invention for extending the resolution, in straight binary code, of a binary coded pattern by two additional binary bits beyond the least significant bit encoded thereon. This particular digital transducer illustrated in FIGURE 1 is responsive to optical energy and is comprised of a rotatable binary coded pattern member 10, hereinafter described as the disc secured to a shaft 11 whose rotational motion or position is to be measured, and a stationary readout mask member 12. It should be appreciated that our binary scale reading system is not limited for use with optical energy, but may be employed with other forms of energy such as, for example, pressurized fluid, magnetic and electrical energy, the disc and readout means obviously having to be of construction appropriate to the particular energy employed. The rotary motion (or linear motion as depicted with reference to FIGURES 4 through 6) of the disc relative to the mask is responsive to a particular phenomenon to be measured by the transducer such as, for example, position, pressure, temperature and force.

Disc 10 is provided with a binary coded pattern having the conventional plurality of parallel disposed binary bit tracks each comprising pairs of areas each alternately transparent and opaque to the particular energy being employed. The number of pairs of alternately transparent and opaque areas in each track vary in accordance with the geometric progression 1:2:4:8:16:32, etc., in correspondence with the most significant to the least significant binary bits of information to be generated. Thus, the least significant bit is obtained from the outermost track of disc 10 and the successively more significant bit tracks are disposed radially inward thereof. The most significant bit track (not illustrated) is disposed nearest the center of disc 10 and comprises one pair of optically transparent and opaque areas. The optically opaque areas are indicated in black and it it to be understood that each track forms a complete ring of the alternately opaque and transparent areas. In the FIGURES 1 and 4 embodiments, each bit track other than the least significant one, is comprised of two parallel disposed subtracks or zones of alternately transparent and opaque areas, the similar areas in the two zones being phase displaced by 180° from each other, and each zone comprised of the aforementioned number of pairs of areas. The opaque and transparent areas in each particular track are of equal width dimension, the curved areas in a track of the FIGURE 1 embodiment having widths defined by arcs subtended by equal angles. In the case of the circular disc 10 in FIGURE 1, each track is comprised of alternately transparent and opaque areas each having a width defined by a particular subtended angle which doubles in magnitude with each successively more significant track.

Figure 4:
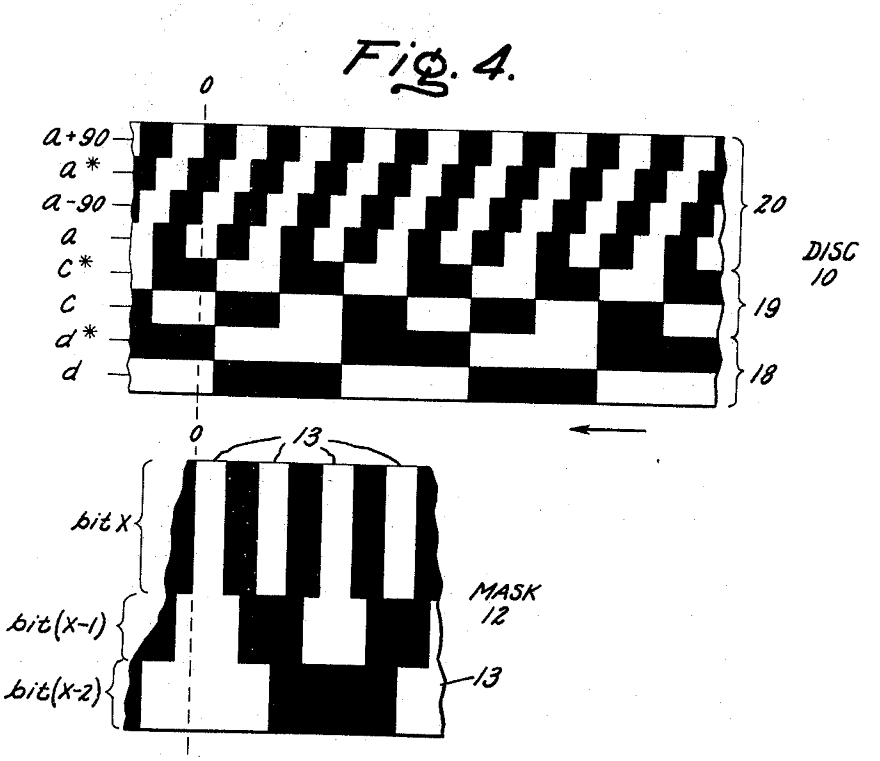
FIGURE 4 is a plan view of a linear embodiment of the binary coded pattern member and readout mask member of the system illustrated in FIGURE 1.
Figure 5:
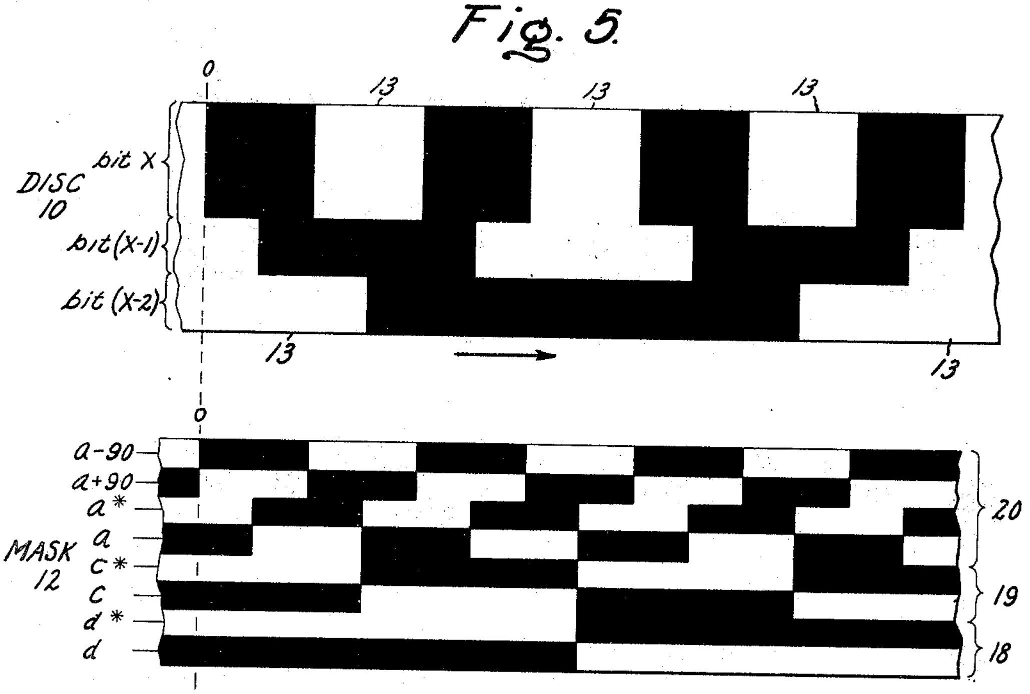
FIGURE 5 is a plan view of a second embodiment of the binary coded pattern member and readout mask member.
Figure 6:
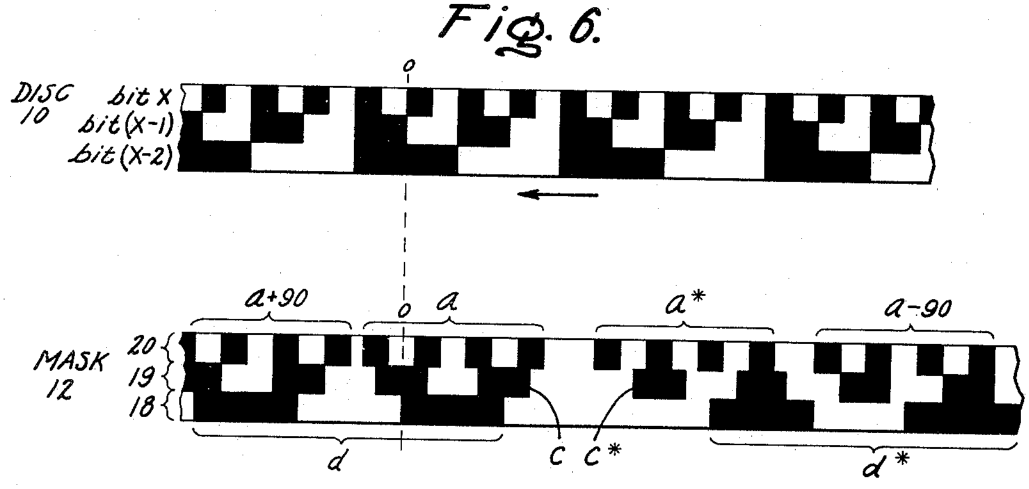
FIGURE 6 is a plan view of a third and preferred embodiment of the binary coded pattern member and readout mask member.

Readout mask 12 is disposed in a parallel, spaced apart, overlying position with respect to disc 10 such that slit 13 is aligned with a radius of disc 10. In practice, slit 13 would normally be aligned with the zero angle reference setting on disc 10. Slit 13 has a variable width corresponding to the width (or fraction thereof) of a single area on each of the associated tracks on mask 10. For purposes of simplification, a single slit 13 is illustrated in FIGURE 1, however, in practice a plurality of slits would be utilized, as indicated in FIGURES 4, 5 and 6 in order to develop a sufficient signal through the mask, it being remembered that the opaque areas in the least significant track may have a resolution as fine as approximately 5,000 lines per inch. A conventional source of energy appropriate to the particular transducer, and a means for detecting such energy which is transmitted through both the transparent areas on disc 10 and slit 13 are the remaining conventional elements in the digital transducer employing our improved binary scale reading system. In the case of the optical digital transducer illustrated in FIGURE 1, the source of energy comprises a single, long, relatively high intensity electric lamp 14, it being understood that a plurality of aligned, short lamps are also suitable. The energy detector for the particular transducer illustrated in FIGURE 1 is a plurality of photocell devices 15 which are aligned with light source 14 and slit 13 such that each particular photocell is illuminated only by the optical energy passing through a transparent area in a particular track when such area is within the field viewed by the photocell through slit 13. Suitable means for converging the energy emitted by source 14 into a relatively small width beam pattern and for concentrating the transmitted energy upon the detector may also be provided. In the case of the optical energy employed in the FIGURE 1 embodiment, cylindrical lenses 16 and 17 are positioned in alignment with source 14, slit 13 and photocells 15 to accomplish the aforementioned refinements.

The improvement in the binary scale reading system in accordance with our invention is in the combination of a uniquely designed least significant bit track and associated circuitry for combining signals obtained from this track to generate additional signals which represent an extended resolution of the binary coded pattern by two additional bits in the case of the straight binary code and by one additional bit in the reflected binary code. The two immediately more significant bit tracks adjacent the least significant bit track are indicated as a whole by numerals 19 and 18, respectively. Track 18 is composed of 180° phase displaced zones *d* and *d and track 19** of zones *c* and *c. The least significant bit track 20 on disc 10** is comprised of four subtracks or zones each having alternately transparent and opaque areas of equal width but phase displaced from each other in the following manner. Zones *a* and *a** are 180° phase displaced from each other, and correspond to the conventional design of zones *c*, *c** and *d*, *d**. The zones identified $a+90$ and $a-90$ are phase displaced +90° and −90°, respectively, relative to zone *a* with the indicated counterclockwise rotation of shaft 11. The portion of slit 13 associated with least significant bit track 20, identified as bit X and shown in full line, is also four zones high whereas the portion of slit 13 associated with each of the illustrated two more significant bit tracks and identified as bit $(X-1)$ and bit $(X-2)$ and shown in dashed line, is only two zones high.

Rotation of shaft 11 in response to a phenomenon to be measured causes a rotary motion of disc 10 relative to stationary mask 12. In the case wherein the slit 13 width is equal to the width of a corresponding bit on disc 10, the rotary motion of disc 10 generates periodic triangular shaped wave electrical signals at the outputs of photocells 15 as the transparent areas in the respective zones pass through the field of view of the photocells. The photocells illustrated in FIGURE 1 in full line are associated with the four zones, *a*, *a, $a+90$ and $a-90$ of least significant bit track 20 as will be explained in detail hereinafter, whereas, the two photocells shown in dashed line are associated with the zones of track 19** to generate the *c* and *c** periodic triangular shaped wave signals.

FIGURE 2A illustrates the phase sequence of the generated $c$ and $c^*$ triangular waves as a function of the relative position of disc 10 from its zero position reference setting, 0, indicated along the circumference of disc 10. Only one zero point is present for the entire binary coded pattern; however, in the particular illustration of FIGURE 1 wherein only the three least significant bit tracks are illustrated, the pattern is repetitive every eight areas along a zone of the least significant bit track.

The pitch of the periodic triangular shaped waves generated at the output of the photocells is equal to one pair of alternately transparent and opaque areas on the associated track (i.e., twice the spatial width of a binary bit on the binary coded pattern). Spatial width is defined herein as an actual distance, and is not a time duration, as indicated by the fact that the waveshapes of FIGURES 2 and 8 are plotted versus position (i.e., distance from zero position reference) rather than time. In the case of each of the more significant bit tracks, the triangular shaped signal outputs of the photocells associated with two zones thereof are combined in a differential amplifier and amplitude detecting circuit providing fast digital switching action to obtain periodic square wave signals having the same pitch as the associated triangular waves and of spatial width (half wave length) equal to the binary bit spatial width. Thus, the $c$ and $c^*$ triangular signals which are generated upon motion of the optically transparent areas of track 19 past the portion of slit 13 identified bit $(X-1)$, are combined to obtain the periodic square wave signals identified in FIGURE 2A as bit $(X-1)$, that is, the binary coded signal obtained from the immediately more significant bit track 19 adjacent the least significant track 20. In like manner, 180° phase displaced periodic triangular shaped wave signals $d$ and $d^*$ (not shown in FIGURE 2) are generated upon motion of the optically transparent areas of track 18 past the portion of slit 13 identified bit $(X-2)$, wherein the pitch of these triangular waves (and resultant periodic square wave signals) is twice that of the $c$ and $c^*$ waves. It is to be understood that each successively more significant track generates a pair of 180° phase displaced triangular shaped signals of doubled pitch, and these triangular shaped signals produce square wave signals of like pitch at the outputs of the associated differential amplifier and amplitude detecting circuits. The 180° phase displaced zones for generating the 180° phase displaced triangular shaped signals are employed to reduce errors caused by changes in signal amplitude due to variations in lamp voltage, photocell drift, lamp aging, etc.

Referring now to the last significant bit track 20 on the disc 10, it should be apparent that the triangular shaped waves, generated upon motion of the transparent areas in each zone through the field of view as seen by photocell 15 through the portion bit X of slit 13, are phase displaced in accordance with the geometry of the respective zones on disc 10. Thus, periodic triangular shaped wave signals $a^*$ are 180° phase displaced from triangular signals $a$ as illustrated in FIGURE 2B. In like manner, triangular wave signals $a+90°$ and $a-90°$ are phase displaced from waves $a$ by +90° and −90°, respectively, as seen in FIGURE 2C.

Figure 3:
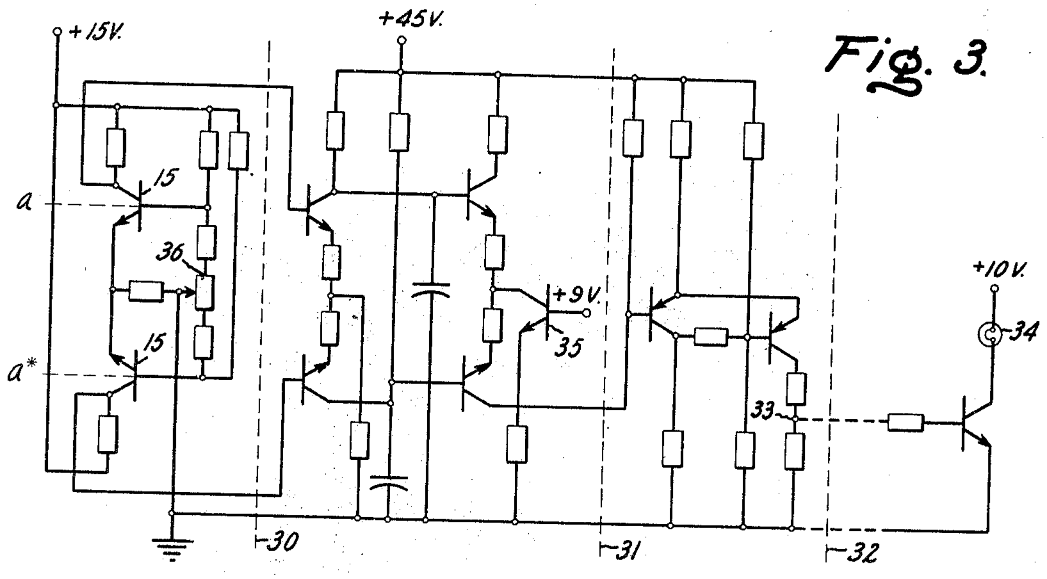
FIGURE 3 is a schematic circuit diagram of one of the differential amplifier and Schmitt trigger circuits illustrated in block diagram form in FIGURE 1.

The outputs of photocells associated with the $a$ and $a^*$ zones are supplied to a first differential amplifier and Schmitt trigger circuit 21 which is shown in detail in the schematic diagram of FIGURE 3. The Schmitt trigger circuit is a particular embodiment of an amplitude detecting circuit and is not construed to be a limitation of the amplitude detecting circuits that may be employed. Other known amplitude detecting circuits which may be employed would utilize Zener reference for bias or a biased differential amplifier circuit. The output of circuit 21 is a first periodic square wave electrical signal of pitch equal to the pitch of the input triangular signals and of width equal to the spatial width of one of the areas on the least significant bit track. In the particular case of circuit 21, input triangular signals $a$ and $a^*$ generate a periodic square wave signal bit X at the output thereof which represents the least significant bit conventionally obtained from a binary coded pattern. The outputs of the photocell associated with $a+90$ zone and one of the photocells associated with $a-90$ zone are supplied to a second differential amplifier and Schmitt trigger circuit 22 which produces at the output thereof a second periodic square wave signal identified as $X+90°$ as seen in FIGURE 2C. Signal $X+90°$ has the same pitch as signal bit X in FIGURE 2B and is phase displaced therefrom by +90°. The periodic square wave signals bit X and $X+90°$ are logically combined in a conventional half adder logic circuit 23 to provide at the output thereof a periodic square wave signal bit $(X+1)$ which represents a first additional binary bit of information, that is, it extends the resolution of the binary coded pattern on disc 10 by one bit. Signal bit $(X+1)$ is shown in FIGURE 2D and is of spatial width and pitch equal to one-half of the square wave signal bit X. The outputs of second photocells associated with the $a^*$ and $a-90$ zones are combined in a third differential amplifier and Schmitt trigger circuit 24 to provide at the output thereof a third periodic square wave signal $X+135°$ as illustrated in FIGURE 2E wherein the pitch of this signal is also equal to the pitch of signal bit X and is phase displaced therefrom by +135°. Finally, the outputs of a second photocell associated with zone $a$ and a third photocell associated with zone $a-90$ are combined in a fourth differential amplifier and Schmitt trigger circuit 25 to provide at the output thereof a fourth periodic square wave signal $X+45°$ as illustrated FIGURE 2F wherein this signal is of the same pitch as signal bit X and is phase displaced therefrom by +45°. The periodic square wave signals $X+45°$ and $X+135°$ are logically combined in a second half-adder circuit 26 to provide at the output thereof the periodic square wave signal shown in FIGURE 2G wherein the pitch is equal to the pitch of the bit $(X+1)$ signal illustrated in FIGURE 2D but phase displaced by +90° therefrom. The square wave signals provided at the output of half-adder circuits 23 and 26 (FIGURES 2D and 2G, respectively), are logically combined in a third half-adder circuit 27 to generate at the output thereof a periodic square wave signal bit $(X+2)$ of pitch and spatial width equal to ¼ of the bit X signal. The bit $(X+2)$ signal represents a second additional binary bit of information and thus the various combinations of the triangular shaped waves and logical combinations of the resulting square waves provides an extended resolution of the binary coded pattern by two additional binary bits beyond the least significant bit as obtained from the least significant bit track 20 on disc 10. Thus, a binary coded pattern may be produced with a line resolution equal to the maximum that can be practically and economically obtained, and by use of our improved binary scale reading system, two additional binary bits beyond the least significant bit as determined by the finest resolution on the pattern, can be obtained.

A schematic diagram of the electrical circuit of the component identified in block diagram form in FIGURE 1 as differential amplifier and Schmitt trigger is illustrated in FIGURE 3 wherein photocells 15, of the phototransistor type, are associated with two different zones of the least significant bit track, in particular, the $a$ and $a^*$ zones. Photocells 15 are connected in a first stage conventional differential amplifier network illustrated to the left of dashed line 30. Additional amplification may be provided by the two further stages of conventional transistorized differential amplifiers shown in the area defined between dashed lines 30 and 31, it being understood that for photocell gains sufficiently high, one or both of these amplifier stages may be omitted. Fast digital switching by means of amplitude level detection is accomplished by the Schmitt trigger circuit illustrated in the area defined between dashed lines 31 and 32. The output of the trigger circuit is available in the transistor collector circuit at junction 33, and an indicator lamp circuit illustrated in the area to the right of dashed line 32 may be employed to display this output signal which is the bistable state of the particular binary bit being generated by the differential amplifier and Schmitt trigger circuit. Obviously readout means other than the indicator lamp 34 may be employed, if desired.

The entire amplifier chain in the FIGURE 3 circuit diagram is direct current coupled and stabilized by means of negative feedback via emitter resistance. Common mode rejection is enhanced by dual emitter bias resistors in the first two stages, and by a bias network of transistors 35 in the third amplifier stage. The first stage amplifier circuit includes a vernier bias adjustment 36 to establish the final switching point for each bit readout. This vernier adjustment is employed to compensate for the slight differences between phototransistor characteristics or for light signal unbalance between phototransistors if this is found to exist.

FIGURE 4 illustrates, in plan view, a portion of a binary coded pattern member and readout mask member having the same pattern as illustrated in FIGURE 1 but adapted for use in a linear encoder wherein a linear motion of the binary coded pattern member 10 is employed as opposed to the rotary motion in FIGURE 1. For purposes of consistency, the binary coded pattern member of FIGURE 4 will also be referred to as disc 10 merely to indicate that it is the movable member. The binary coded pattern or disc 10 in the FIGURE 4 embodiment is the same as that illustrated in the FIGURE 1 embodiment except for the fact that each zone is formed in a straight line as opposed to the circular form in FIGURE 1. Thus, each energy transparent and opaque area in each of the zones comprising one of the tracks is of equal spatial width in the FIGURE 4 embodiment. Mask 12 in FIGURE 4 is illustrated as having a plurality of slits 13 to obtain a sufficient signal of the particular energy being transmitted therethrough for registration upon the energy detector positioned beyond the mask. The mask 12 in the FIGURE 1 embodiment in the most general case would also employ this plurality of slits. Disc 10 illustrates only portions of the three least significant bit tracks 18, 19, 20 and the associated zones, and mask 12 illustrates only the slit portions bit X, bit $(X-1)$ and bit $(X-2)$ respectively associated therewith, as in the case of the FIGURE 1 embodiment. The zero position reference point 0 on disc 10 and mask 12 is indicated, as well as the direction of linear motion of disc 10 for generating the particular wave shapes illustrated in FIGURE 2.

FIGURE 5 is a plan view of a second embodiment of the binary coded member 10 and readout mask member 12, again described as disc 10 and mask 12, respectively. The FIGURES 5 (and 6) embodiment, although illustrated for a linear encoder type transducer may obviously be employed on a shaft encoder by arranging the patterns on circular members as illustrated in FIGURE 1. A comparison of the FIGURES 4 and 5 embodiments illustrates the distinguishing aspects of the latter embodiment. In the FIGURE 4 embodiment, the binary coded pattern including the various 90° phase displaced zones $a$, $a^*$, $a+90$ and $a-90$ of the least significant bit track 20 is provided on the pattern on disc 10. Since the FIGURES 4 and 1 disc 10 is provided with the relatively complex binary coded pattern along the entire relatively large surface thereof, whereas the relatively simple slit pattern 13 is provided on the smaller surface of mask 12, it is apparent that a more economical disc 10 mask 12 combination may be fabricated by substituting one pattern for the other, that is, providing the 90° phase displaced zones of the least significant bit track (and the 180° phase displaced zones of the more significant bit tracks) on mask 12, and providing the slit pattern on disc 10. This latter more economical arrangement is illustrated in the FIGURE 5 embodiment wherein the slit pattern 13 is provided along the entire surface of disc 10 and the more complex binary coded pattern is provided on the surface of the smaller mask 12. The four zones of the least significant bit track 20 are arranged in an order different from that illustrated on disc 10 in FIGURE 4 merely to illustrate that they need not follow any specific sequence, it being understood that the energy detectors 15 are likewise rearranged. The direction of motion of disc 10 is illustrated for generating the wave shapes illustrated in FIGURE 2 and the zero position reference point is also indicated on disc 10 and mask 12.

FIGURE 6 illustrates a third and preferred embodiment of disc 10 and mask 12 which is further simplified in that the various zones for each bit track are all located in one band. The FIGURE 6 embodiment evolves from the FIGURE 5 embodiment in that the binary coded pattern is provided on mask 12 and the slit pattern is provided on disc 10. Accordingly, the least significant bit track 20 on mask 12 comprises a first group of alternately transparent and opaque areas designated $a$, a second group 180° phase displaced therefrom and designated $a^*$, a third group phase displaced from group $a$ by $+90°$ and designated $a+90$, and a fourth group phase displaced from group $a$ by $-90°$ and designated $a-90$. The four groups of areas on the least significant bit track 20 of mask 12 bear the same phase relation to the corresponding transparent and opaque areas on the bit X portion of the slit pattern on disc 10 as do the four zones of the least significant bit track in FIGURES 5 and 4 to the transparent and opaque areas of the bit X portion of the slit pattern employed therewith. In like manner, the two 180° phase displaced groups of alternately transparent and opaque areas on each more significant bit track on mask 12 in FIGURE 6 bear the same phase relation to the corresponding more significant bit portions of the slit pattern on disc 10 in FIGURE 6 as do the various 180° phase displaced zones in the FIGURES 4 and 5 embodiments to the corresponding portions of the slit pattern thereon. Thus, the transparent and opaque areas on the immediately more significant bit track 19 comprising zone $c$ are located to the left of center on mask 12 and the areas comprising zone $c^*$ are located to the right. The zero position reference point and linear motion of disc 10 to generate the waveforms illustrated in FIGURE 2 are also shown. The FIGURE 6 embodiment is a preferred embodiment of our disc-mask combination since each member can be made approximately one-half the size of the corresponding members in the previous embodiments while obtaining the same resolution. The disc 10 is seen to have the inherent simplicity of disc 10 in the FIGURE 5 embodiment without the attendant need to employ four separate zones for the least significant bit (bit X) portion of the slit pattern and two separate zones for the portions associated with the more significant bit tracks. The same simplicity advantages accrue for the mask as for the disc.

The block diagram portion of our binary scale reading system as illustrated in FIGURE 1 is adapted to provide an extended resolution of a binary coded pattern by two additional bits of the straight binary code. A disc-mask combination provided with a similar binary coded pattern and similar slit patterns as illustrated in FIGURES 1, 4, 5 and 6 may be employed with the signal combining circuit illustrated in block diagram form in FIGURE 7 to provide an extended resolution of the binary coded pattern by one additional bit in the reflected binary code. The difference between the straight and reflected binary coded patterns is a matter of phase relationships of the various tracks, as is well known in the art. The triangular wave shaped signals generated by the detector devices 15 upon relative motion between the slit pattern and binary coded pattern of the disc-mask combination are supplied to various differential amplifiers of the type illustrated in FIGURE 3. Thus, triangular shaped signals detected through the transparent areas associated with the $a$ and $a^*$ zones are supplied to a first differential amplifier and Schmitt trigger circuit 70 and provide at the output thereof a first periodic square wave signal bit X of pitch equal to the pitch of the input triangular signals and of spatial width equal to one of the areas on the least significant bit track on the binary coded pattern. Signal bit X represents the least significant binary bit of information conventionally obtainable from a reflected binary coded pattern. The $a$ and $a^*$ wave shapes and their phase relation is illustrated in FIGURE 8A. Similarly, the triangular wave shaped signals associated with the $a$ and $a+90$ zones are supplied to a second differential amplifier and Schmitt trigger circuit 71 to provide at the output thereof a second periodic square wave signal designated $X-45°$ which is of pitch equal to the bit X square wave signal and phase displaced therefrom by $-45°$ as illustrated in FIGURE 8$B$. The triangular wave shaped signals associated with the $a$ and $a-90$ zones are supplied to a third differential amplifier and Schmitt trigger circuit 72 to provide at the output thereof a third periodic square wave signal $X+45°$ as depicted in FIGURE 8B wherein the pitch of this latter square wave signal is equal to the pitch of the bit X signal and is phase displaced therefrom by $+45°$. The second and third periodic square wave signals $X-45°$ and $X+45°$ are supplied to a half-adder logic circuit 73 to develop at the output thereof a fourth periodic square wave signal designated bit $(X+1)$ which has a spatial width and pitch equal to one-half of the bit X signal and represents an extended resolution of the reflected binary coded pattern by one additional bit of information in the reflected binary code.

It is apparent from the foregoing that our invention attains the objectives set forth in that it provides an improved binary scale reading system which extends the resolution of a binary coded pattern by two additional bits in the straight binary code and by one additional bit in the reflected binary code. The improvement is obtained by providing the least significant bit track on a binary coded pattern with transparent and opaque areas in groups that are phase displaced by $+90°$, $-90°$ and $180°$. Resultant triangular wave shaped signals of energy are detected upon transmission through the transparent areas of the binary coded pattern and a readout slit pattern and are suitably combined in differential amplifier and amplitude detecting circuits for generating periodic square wave signals of spatial width equal to the least significant bit and having particular phase relationships. These square wave signals are then logically combined in one (or three) half adder circuits to generate at the output thereof signals representing the additional bit in the reflected binary code (or two additional bits in the straight binary code).

Having described specific embodiments of a binary coded pattern member and readout member which are appropriate in our binary scale reading system for the straight or reflected binary code, and circuitry for combining the signals obtained from such members to develop the extended resolution bits, it is believed obvious that modification and variation of our invention is possible in the light of the above teachings. Thus, our binary scale reading system is also adapted for use with types of energies other than the optical energy herein described. In particular, pressurized fluid jets may be employed as the source of energy 14 and suitable fluid receivers employed as the energy detector 15; and in this particular application the circuitry comprising the differential amplifiers and Schmitt triggers and half adders may also be comprised solely of fluidic elements to provide an all fluid system. It is also possible to omit the $a-90$ zone in the least significant bit track since the signal obtained from the $a+90$ zone may be converted directly into the periodic square wave signals $X+90°$ illustrated in FIGURE 2C by level detection of the output of the detector associated therewith. This latter scheme, however, only permits toleration of errors (in signal width) as large as 12½% before a binary count is missed whereas the use of all four zones permits toleration of error as large as 50%. The binary coded pattern can also be extended in resolution by two additional bits in the reflected binary code by providing additional zones in the least significant bit track to obtain triangular wave shaped signals phase displaced from the $a$ signal by $+135°$ and $-135°$ and combining these signals with the previously developed ones in additional differential amplifiers and Schmitt trigger circuits and half adder circuits. Finally, our invention of extended resolution may also be used in a binary encoder employing slit optics, that is, the readout mask width is small compared to a spatial width of an area on a corresponding track. By this latter scheme, the first groups of periodic square waves are generated directly at the outputs of the photocells. It is, therefore, to be understood that changes may be made in the particular embodiments as described which are within the full intended scope of the invention as defined by the following claims.

What we claim as new and desire to secure by Letters Patent of the United States is:

1. In an improved binary scale reading system comprising a binary coded pattern and readout means wherein the binary coded pattern comprises a member movable in response to a phenomenon to be measured and provided with a plurality of parallel tracks, each track comprising pairs of areas each alternately transparent and opaque to a particular type energy, the number of pairs of alternately transparent and opaque areas in each track varying in accordance with the geometric progression 1:2:4:8:16:32, etc., in correspondence with the most significant to the least significant binary bits of information to be generated, the improvement comprising the least significant bit track of pairs of alternately transparent and opaque areas comprising:

- a first group of alternately transparent and opaque areas each of spatial width equal to the least significant bit width on the binary coded pattern,
- a second group of alternately transparent and opaque areas each of spatial width substantially equal to the first group areas and phase displaced therefrom by 180°,
- a third group of alternately transparent and opaque areas each of spatial width substantially equal to the first group areas and phase displaced therefrom by $+90°$, and
- a fourth group of alternately transparent and opaque areas each of spatial width substantially equal to the first group areas and phase displaced therefrom by $-90°$.

2. In the improved binary scale reading system set forth in claim 1 wherein:

said first, second, third and fourth groups of alternately transparent and opaque areas of the least significant bit track on the binary coded pattern member are positioned in a single zone parallel to the more significant bit tracks.

3. In the improved binary scale reading system set forth in claim 1 wherein:

said first, second, third and fourth groups of alternately transparent and opaque areas of the last significant bit track on the binary coded pattern member are positioned in four zones parallel to each other and parallel to the more significant bit tracks.

4. In the improved binary scale reading system set forth in claim 1 wherein the readout means comprises a stationary mask member provided with areas transparent and opaque to the particular type energy and positioned in alignment with the binary coded pattern member and a source of the particular energy for viewing a selected portion of each of the plurality of tracks on the binary coded pattern, and a plurality of means for detecting the energy transmitted through particular transparent areas of the binary coded pattern and mask which are aligned in accordance with the relative position therebetween, the improvement comprising the portion of the mask member associated with the least significant bit track on the binary coded pattern member and comprising:

a first plurality of alternately transparent and opaque areas each of spatial width equal to the least significant bit width on the binary coded pattern and aligned with the first group of areas on the binary coded pattern member for producing first periodic triangular wave shaped signals at the output of first detecting means associated therewith upon relative motion between the binary coded pattern member and mask member, a second plurality of alternately transparent and opaque areas each of spatial width substantially equal to the first areas and aligned with the second group of areas on the binary coded pattern member for producing second periodic triangular wave shaped signals at the output of second detecting means associated therewith and phase displaced from the first triangular waves by 180°, a third plurality of alternately transparent and opaque areas each of spatial width substantially equal to the first areas and aligned with the third group of areas on the binary coded pattern member for producing third periodic triangular wave shaped signals at the output of the third detecting means associated therewith and phase displaced from the first triangular waves by +90°, and a fourth plurality of alternately transparent and opaque areas each of spatial width substantially equal to the first areas and aligned with the fourth group of areas on the binary coded pattern member for producing fourth periodic triangular wave shaped signals at the output of fourth detecting means associated therewith and phase displaced from the first triangular waves by −90°.

5. In the improved binary scale reading system set forth in claim 4 and further comprising:

means in communication with the outputs of the first and second detecting means for generating first periodic square wave signals upon relative motion between the binary coded pattern member and mask member, each square wave representing a least significant binary bit on the binary coded pattern and being of spatial width equal to the width thereof, means is communication with the outputs of the first and third detecting means for generating second periodic square wave signals phase displaced from the first square waves by −45° and of equal spatial width, means is communication with the outputs of the third and fourth detecting means for generating second riodic square wave signals phase displaced from the first square waves by +45° and of equal spatial width, and means for logically combining the second and third and fourth square wave signals to obtain fifth and sixth periodic square wave signals of spatial widths respectively equal to ½ and ¼ the width of the first quare waves, the fifth and sixth square waves representing an extended resolution of the binary coded pattern equal to two additional binary bits of information.

6. In the improved binary scale reading system set forth in claim 4 and further comprising:

means in communication with the outputs of the first and second detecting means for generating first periodic square wave signals upon relative motion between the binary coded pattern member and mask member, each square wave representing a least significant binary bit on the binary coded pattern and being of spatial width equal to the width thereof, means in communication with the outputs of the first and fourth detecting means for generating second periodic square wave signals phase displaced from the first square waves by 45° and of equal spatial width, means is communication with the outputs of the third and fourth detecting means for generating third periodic square wave signals phase displaced from the first square wave by 90° and of equal spatial width, means in communication with the outputs of the second and fourth detecting means for generating fourth periodic square wave signals phase displaced from the first square waves by 135° and of equal spatial width, and means for logically combining the first, second, third, and fourth square wave signals to obtain fifth and sixth periodic square wave signals of spatial widths respectively equal to ½ and ¼ the width of the first square waves, the fifth and sixth square waves representing an extended resolution of the binary coded pattern equal to two additional binary bits of information.

7. In the improved binary scale reading system set forth in claim 6 wherein:

said logic combining means comprises;

a first half adder logic circuit, input to said first half adder in communication with the outputs of said first and third square wave generating means, output of said first half adder comprising the fifth square waves which represent a first of the two additional binary bits of information, a second half adder logic circuit, input to said second half adder in communication with the outputs of said second and fourth square wave generating means, and a third half adder logic circuit, input to said third half adder in communication with the outputs of said first and second half adders, output of said third half adder comprising the sixth square waves which represent the second of the two additional binary bits of information.

8. In the improved binary scale reading system set forth in claim 6 wherein:

said first square wave generating means comprises a first differential amplifier and amplitude detecting circuit for combining the first and second periodic triangular wave shaped signals to form the first periodic square waves, the triangular waves having a pitch equal to twice the width of the least significant binary bit on the binary coded pattern.

said second square wave generating means comprising a second differential amplifier and amplitude detecting circuit for combining the first and fourth periodic triangular wave shaped signals to form the second periodic square waves, said third square wave generating means comprising a third differential amplifier and amplitude detecting circuit for combining the third and fourth periodic triangular wave shaped signals to form the third periodic square waves, and said fourth square wave generating means comprising a fourth differential amplifier and amplitude detecting circuit for combining the second and fourth periodic triangular wave signals to form the fourth periodic square waves.

9. In an improved binary scale reading system comprising a binary coded pattern and readout means wherein the binary coded pattern comprises a member movable in response to a phenomenon to be measured and provided with a plurality of parallel tracks, each track comprising pairs of areas each alternately transparent and opaque to a particular type energy, the number of pairs of alternately transparent and opaque areas in each track varying in accordance with the geometric progression 1:2:4:8:16:32, etc., in correspondence with the most significant to the least significant binary bits of information to be generated, and the readout means comprises a stationary mask member provided with areas transparent and opaque to the particular type energy and positioned in alignment with the binary coded pattern member and a source of the particular energy for viewing a selected portion of each of the plurality of tracks on the binary coded pattern, and a plurality of means for detecting the energy transmitted through particular transparent areas of the binary coded pattern and mask aligned in accordance with the relative position therebetween, the improvement comprising the portion of the mask member associated with the least significant bit track on the binary coded pattern member and comprising a first plurality of alternately transparent and opaque areas each of spatial width equal to the least significant bit width on the binary coded pattern and aligned with the least significant bit track on the binary coded pattern member for producing first periodic triangular wave shaped signals at the output of first detecting means associated therewith upon relative motion between the binary coded pattern member and mask member, a second plurality of alternately transparent and opaque areas each of spatial width substantially equal to the first areas and aligned with the least significant bit track for producing second periodic triangular wave shaped signals at the output of second detecting means associated therewith and phase displaced from the first triangular waves by 180°, a third plurality of alternately transparent and opaque areas each of spatial width substantially equal to the first areas and aligned with the least significant bit track for producing third periodic triangular wave shaped signals at the output of third detecting means associated therewith and phase displaced from the first triangular waves by +90°, and a fourth plurality of alternately transparent and opaque areas each of spatial width substantially equal to the first areas and aligned with the least significant bit track for producing fourth periodic triangular wave shaped signals at the output of fourth detecting means associated therewith and phase displaced from the first triangular waves by −90°.

10. In the improved binary scale reading system set forth in claim 9 wherein:

the least significant bit track on the binary coded pattern member comprises four zones each comprising pairs of the alternately transparent and opaque areas wherein the four zones are parallel to each other and parallel to the more significant bit tracks, and the first, second, third and fourth plurality of alternately transparent and opaque areas on the mask member associated with the least significant bit track are arranged in four parallel zones corresponding to the four zones of the least significant bit track.

11. In the improved binary scale reading system set forth in claim 9 wherein:

the least significant bit track on the binary coded pattern member comprises a single zone parallel to the more significant bit tracks, and the first, second, third and fourth plurality of alternately transparent and opaque areas on the mask member associated with the least significant bit track are arranged in a single zone.

12. In an improved digital transducer having a movable binary coded pattern member and stationary mask member each provided with optically transparent and opaque areas, said binary coded pattern member provided with a plurality of tracks each comprising pairs of alternately optically transparent and opaque areas, the number of pairs of alternately optically transparent and opaque areas in each track varying in accordance with the geometric progression 1:2:4:8:16:32, etc., in correspondence with the most significant to the least significant binary bits of information to be generated, electro-optical means for viewing a selected region of each of the tracks on the binary coded pattern member as defined by the optically transparent areas of the mask member and including a light source and photocells located on opposite sides of the binary coded pattern member and mask member, and electrical circuit means in communication with the photocells for utilizing the electrical signal output thereof to provide a binary coded electrical signal indicative of the magnitude of a phenomenon being measured by the relative movement between the binary coded pattern member and mask member, the improvement comprising:

a first, second, third and fourth group of alternately optically transparent and opaque areas positioned on said mask member in alignment with the least significant bit track on the binary coded pattern member, each area of spatial width substantially equal to the least significant bit width, the second, third and fourth groups of areas respectively phase displaced from the first group by +90°, −90° and 180°, and at least one photocell associated with each of the first, second, third and fourth groups of optically transparent areas, the electrical circuit means in communication with the photocells associated with said first, second, third and fourth groups of optically transparent areas comprising first means for combining the electrical signal outputs from the photocells associated with said first and fourth groups of optically transparent areas to obtain a binary coded signal representing the least significant binary bit of information, second means for combining the electrical signal outputs from the photocells associated with said second and third groups of optically transparent areas, third means for combining the electrical signal outputs of said first and second combining means to obtain a binary coded signal representing a first additional binary bit of information, fourth means for combining the eletcrical signal outputs from the photocells associated with said third and fourth groups of optically transparent areas, fifth means for combining the electrical signal outputs from the photocells associated with said first and third groups of optically transparent areas, sixth means for combining the electrical signal outputs of said fourth and fifth combining means, and seventh means for combining the electrical signal outputs of said third and sixth combining means to obtain a binary coded signal representing a second additional binary bit of information whereby the resolution of the binary coded pattern is extended by two binary bits.

13. The improved digital transducer set forth in claim 12 wherein:

said first, second, fourth, and fifth means each comprise an electronic differential amplifier and amplitude detecting circuit, and said third, sixth, and seventh means each comprise an electronic half-adder logic circuit.

14. In an improved binary scale reading system comprising a binary coded pattern and readout means wherein the binary coded pattern comprises a member movable in response to a phenomenon to be measured and provided with a plurality of parallel tracks, each track comprising pairs of areas each alternately transparent and opaque to a particular type energy, the number of pairs of alternately transparent and opaque areas in each track varying in accordance with the geometric progression 1:2:4:8:16:32, etc., in correspondence with the most significant to the least significant binary bits of information to be generated, and the readout means comprises a stationary mask member provided with areas transparent and opaque to the particular type energy and positioned in alignment with the binary coded pattern member and a source of the particular energy for viewing a selected portion of each of the plurality of tracks on the binary coded pattern, and a plurality of means for detecting the energy transmitted through particular transparent areas of the binary coded pattern and mask aligned in accordance with the relative position therebetween, the improvement comprising the combination of the least significant bit track on said binary coded pattern member and the portion of the mask member associated with the least significant bit track on the binary coded pattern member, the least significant bit track on said binary coded member and the portion of the mask member associated with the least significant bit track being in alignment and each comprising:

first, second, third, and fourth groups of alternately transparent and opaque areas each of spatial width equal to the least significant bit width on the binary coded pattern, the second, third, and fourth groups of alternately transparent and opaque areas on only one of the binary coded pattern and mask members associated with the least significant bit track being phase displaced from the first group thereof by +90°, −90°, and 180° to thereby produce first, second, third, and fourth periodic triangular wave shaped signals at the outputs of detecting means aligned therewith upon relative motion between the binary coded pattern member and mask member, the second, third, and fourth triangular wave shaped signals being phase displaced from the first signal by +90°, −90°, and 180°, respectively.

15. In the improved binary scale reading system set forth in claim 14 wherein:

the first, second, third, and fouth groups of alternately transparent and opaque areas on said binary coded pattern member are in phase, and the second, third, and fourth groups of alternately transparent and opaque areas on said mask member are phase displaced from the first group thereof by +90°, −90°, and 180°.

16. In the improved binary scale reading system set forth in claim 14 wherein:

the first, second, third, and fourth groups of alternately transparent and opaque areas on said mask member are in phase, and the second, third, and fourth groups of alternately transparent and opaque areas on said binary coded pattern member are phase displaced from the first group thereof by +90°, −90°, and 180°.

References Cited

UNITED STATES PATENTS

| | | | |
|---|---|---|---|
| 3,310,798 | 3/1967 | Wingate | 340—347 |
| 3,371,335 | 2/1968 | Seewald | 340—347 |
| 3,388,262 | 6/1968 | Stutz | 250—237 |

MAYNARD R. WILBUR, Primary Examiner

M. K. WOLENSKY, Assistant Examiner

U.S. Cl. X.R.

250—233